United States Patent
Tsirkin

(10) Patent No.: US 9,658,832 B2
(45) Date of Patent: May 23, 2017

(54) MULTI-FACTOR ENTROPY SOURCING FOR RANDOM NUMBER GENERATORS

(71) Applicant: Red Hat Israel, Ltd., Raanana (IL)

(72) Inventor: Michael Tsirkin, Yokneam Yillit (IL)

(73) Assignee: Red Hat Israel, Ltd., Raanana (IL)

(*) Notice: Subject to any disclaimer, the term of this patent is extended or adjusted under 35 U.S.C. 154(b) by 184 days.

(21) Appl. No.: 14/715,146

(22) Filed: May 18, 2015

(65) Prior Publication Data
US 2016/0342394 A1   Nov. 24, 2016

(51) Int. Cl.
G06F 7/58      (2006.01)
H04L 9/00      (2006.01)

(52) U.S. Cl.
CPC .............. *G06F 7/588* (2013.01); *H04L 9/002* (2013.01)

(58) Field of Classification Search
CPC ................................ G06F 7/588; H04L 9/002
See application file for complete search history.

(56) References Cited

U.S. PATENT DOCUMENTS

| | | |
|---|---|---|
| 7,930,332 B2 | 4/2011 | Acar et al. |
| 8,019,802 B2 | 9/2011 | Rose et al. |
| 8,189,778 B2 | 5/2012 | Zhang |
| 8,489,660 B2 | 7/2013 | Herbert et al. |
| 8,787,564 B2 | 7/2014 | Brown |
| 8,805,906 B2 | 8/2014 | Vergnes et al. |
| 2006/0067527 A1* | 3/2006 | Urivskiy ............. G06F 7/588 380/46 |
| 2010/0106756 A1 | 4/2010 | Ellison |
| 2010/0195829 A1* | 8/2010 | Blom .................. G01S 19/14 380/255 |
| 2010/0306296 A1* | 12/2010 | Inglett ............... G06F 7/582 708/255 |
| 2011/0047545 A1 | 2/2011 | Ellison et al. |
| 2014/0244785 A1 | 8/2014 | Potlapally et al. |

FOREIGN PATENT DOCUMENTS

WO     2013101101 A1     7/2013

OTHER PUBLICATIONS

Barker, Elaine and Kelsey, John, "Recommendation for the Entropy Sources Used for Random Bit Generation", National Institute of Standards and Technology, U.S. Dept. of Commerce, Aug. 2012, 78 pages http://csrc.nist.gov/publications/drafts/800-90/draft-sp800-90b.pdf.

(Continued)

*Primary Examiner* — Chuong D Ngo
(74) *Attorney, Agent, or Firm* — Lowenstein Sandler LLP

(57) ABSTRACT

Systems and methods for multi-factor entropy sourcing for random number generators. An example method may comprise: identifying, by a processing device, a plurality of entropy sources; receiving random bits from each of the plurality of entropy sources; identifying a minimum number of bits among numbers of bits received from each of two or more entropy sources of the plurality of entropy sources; mixing, into an entropy pool, at least the identified minimum number of bits received from each entropy source of two or more entropy sources; and increasing a size of the entropy pool by the identified minimum number of bits.

20 Claims, 5 Drawing Sheets

(56) References Cited

OTHER PUBLICATIONS

Eastlake, D., et al., "Randomness Recommendations for Security", Digital Equipment Corporation, Littleton, MA; CyberCash Inc, Vienna, VA; Massachusetts Institute of Technology, Cambridge, MA, Dec. 1994, 29 pages https://www.ietf.org/rfc/rfc1750.txt.

Gutman, Peter, "Random Number Generation", Cryptographic Security Architecture Design and Verification, Chapter 6, Springer-Verlag New York, Inc., 2004, pp. 153-193.

Mungkee, Dr., "Cryptographic Random Number Generators", Phrack Magazine, Issue 59, Jul. 28, 2002, pp. 1-16 http://phrack.org/issues/59/15.html.

* cited by examiner

MULTI-FACTOR ENTROPY SOURCING FOR RANDOM NUMBER GENERATORS

TECHNICAL FIELD

The present disclosure is generally related to computer systems, and is more specifically related to systems and methods for multi-factor entropy sourcing for random number generators.

BACKGROUND

Various computer-based applications employ increasingly strong cryptographic algorithms that foil pattern analysis attempts. However, the security of these systems is dependent on generating secret quantities cryptographic keys. A sophisticated attacker of these systems may find it easier to reproduce the environment that produced the secret quantities than to locate the quantities in the whole of the number space.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
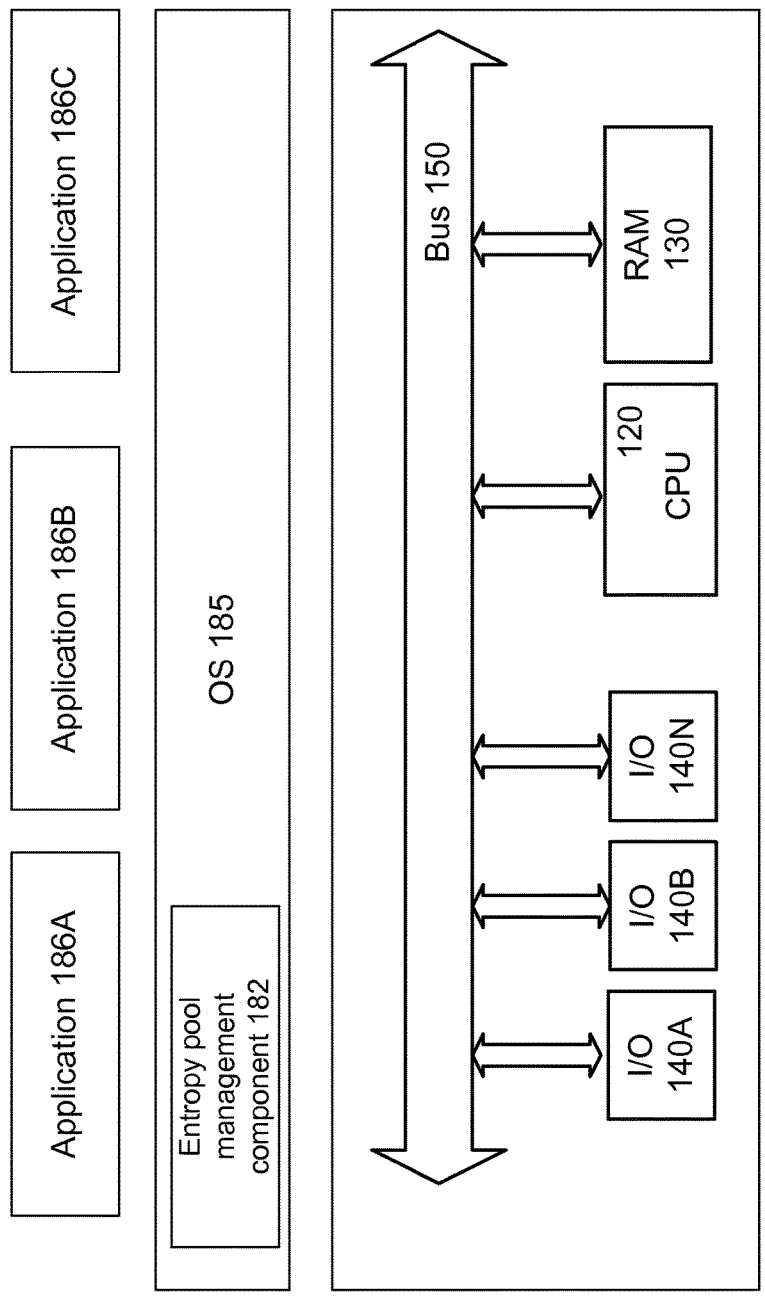
FIG. 1 depicts a high-level component diagram of an example computer system configured to implement the methods described herein, in accordance with one or more aspects of the present disclosure.

Described herein are methods and systems for multi-factor entropy sourcing for random number generators.

"Entropy" herein shall refer to random data. "Entropy pool" herein shall refer to a memory buffer comprising random data.

Entropy (e.g., in the form of a bit stream) may be gathered by observing events that occur randomly, for example, by measuring time intervals between such events, counting such events, etc. The random events may originate from hard-to-predict events, such as network, user and disk activity (e.g., key-presses, mouse movements, jitter of disk access times), and the like. The resulting data (e.g., measured time intervals, event counts, etc.) can be stored in an entropy pool. An operating system may implement an entropy pool management component to maintain the entropy pool and continually fill it with entropy, e.g., by mixing into the entropy pool the random bits produced by one or more physical devices. The collected random data may be pre-processed (e.g., compressed); the mixing operation may be implemented using various digest functions (e.g., hash functions). The entropy pool management component may further make the entropy form the pool available to various applications. In certain implementations, the entropy pool management component may implement a random number generator producing a digest (e.g., a cryptographic hash function such as MDA5 or SHA-1) of a certain number of entropy bits.

In an illustrative example, the random number generator may be implemented in the form of a device file, e.g., /dev/random, which may be readable by user-level processes. When a user-level process reads the /dev/random device file, the entropy pool management component may only produce a return value if the number of bits available in the entropy pool is sufficient for producing such as value; otherwise, the read operation may block until the required quantity of entropy becomes available in the entropy pool.

Thus, keeping a correct estimate of the entropy pool size significantly affects the quality of a random number generator that uses the entropy pool as the entropy source. If a malicious party controls or monitors at least some entropy sources (e.g., monitors the traffic through one or more network interface controllers), and/or may cause a user-level application to deplete the entropy pool by issuing multiple entropy pool reads, the entropy estimation may become too high, which in turn would cause the random number produced based on the entropy pool become pseudo-random. Having observed a certain sequence of such pseudo-number numbers, a malicious party may successfully predict the future values, thus potentially compromising the security of the applications relying upon the perceived randomness.

Aspects of the present disclosure address the above noted and other deficiencies by providing methods and systems for multi-factor entropy sourcing for random number generators. In accordance with one or more aspects of the present disclosure, the entropy pool management component may conservatively estimate the entropy, by requiring that each bit in the entropy pool would be a result of mixing multiple bits coming from different entropy sources.

In an illustrative example, the entropy pool management component may identify several entropy sources represented by various physical devices (e.g., a network interface controller, a mouse, a disk controller, a processor, etc.). Responsive to receiving random bits from each entropy source, the entropy pool management component may identify the minimum number among the number of bits received from two or more entropy sources of the identified several entropy sources. The entropy pool management component may then mix, into the entropy pool, at least the identified minimum number of bits received from each entropy source of two or more entropy sources, and increase the size of the entropy pool by the identified minimum number of bits. In certain implementations, the minimum number of entropy sources to provide the entropy bits for mixing into the entropy pool may be specified as a parameter of the method. The mixing operation may be implemented using various digest functions (e.g., hash functions).

Thus, a malicious party controlling only some of the entropy sources (e.g., by monitoring the traffic through one or more network interface controllers) would not be able to cause the applications to consume predictable pseudo-random numbers, even though a malicious party controlling at least one user-level application may still be able to deplete the entropy pool by issuing multiple entropy pool reads.

Various aspects of the above referenced methods and systems are described in details herein below by way of examples, rather than by way of limitation.

FIG. 1 depicts a high-level component diagram of an illustrative example of a computer system 100 that may be employed to perform the methods for multi-factor entropy sourcing for random number generators, in accordance with one or more aspects of the present disclosure. Computer system 100 may comprise one or more physical processors 120 communicatively coupled to memory devices 130 and input/output (I/O) devices 140A-140N via a system bus 150.

"Processor" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data. Examples of I/O devices 140 include a network interface controller, a disk controller, a keyboard, a mouse, a processor, etc.

In the illustrative example of FIG. 1, computer system 100 may execute an operating system 185 controlling one or more applications 186. Alternatively, computer system 100 may run one or more virtual machines (not shown in FIG. 1), by executing a software layer, often referred to as "hypervisor," above the hardware and below the virtual machines. The hypervisor may abstract the physical layer, including processors, memory, and I/O devices, and present this abstraction to the virtual machines as virtual devices. A virtual machine may execute a guest operating system and one or more applications.

In accordance with one or more aspects of the present disclosure, operating system 185 may include an entropy pool management component 182, which may implement the methods for multi-factor entropy sourcing for random number generators, in accordance with one or more aspects of the present disclosure.

Figure 2:
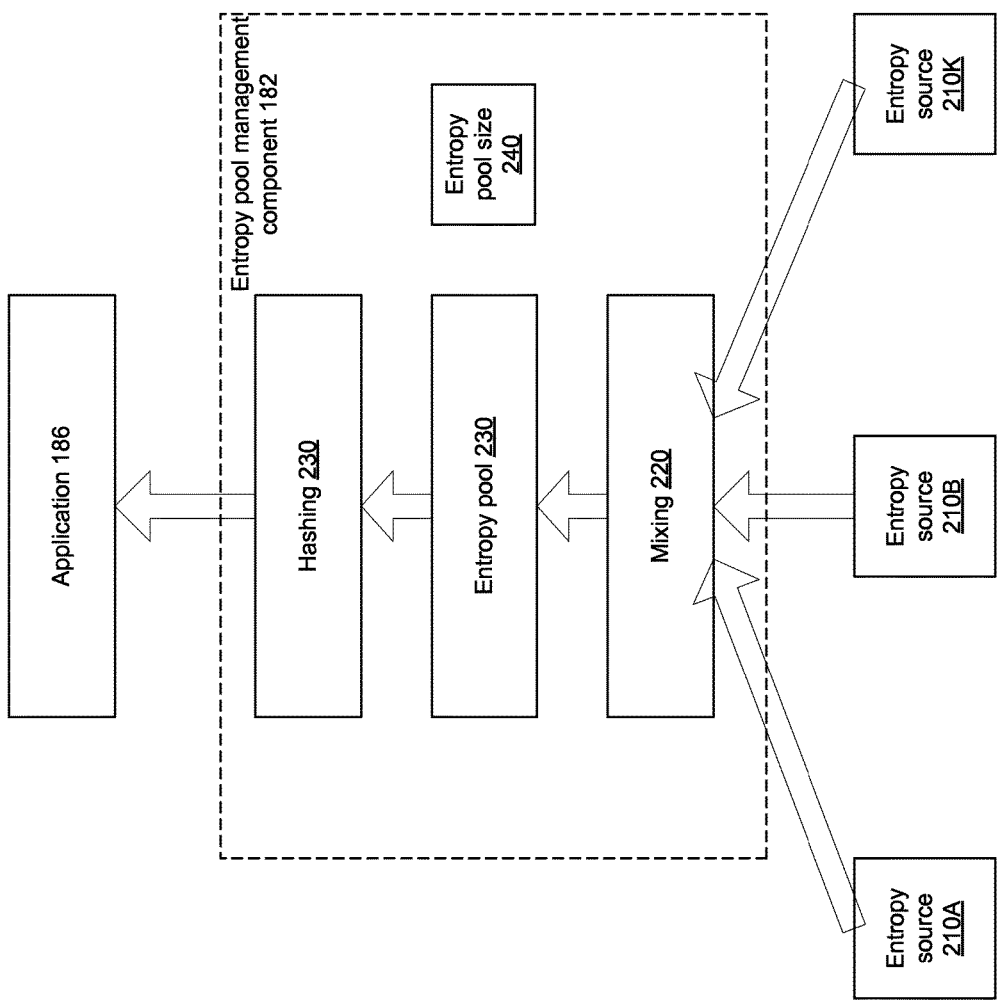
FIG. 2 schematically illustrates an example entropy pool management component operating in accordance with one or more aspects of the present disclosure.

FIG. 2 schematically illustrates an example entropy pool management component operating in accordance with one or more aspects of the present disclosure. As schematically illustrated by FIG. 2, entropy pool management component 182 may employ a plurality of entropy sources 210A-210K represented by various physical devices, such as I/O devices 140A-140N of FIG. 1 (e.g., a network interface controller, a mouse, a disk controller, a processor, etc.). Entropy pool management component 182 may collect the information reflecting the timing of various hardware-related events and/or the data related to the hardware devices, e.g., by receiving the information from the operating system kernel and/or interrupt handlers of the respective hardware interrupts. In certain implementations, the collected random data may be pre-processed (e.g., compressed).

Responsive to receiving random bits from the identified entropy sources 210A-210K, entropy pool management component 182 may identify the minimum number among the number of bits received from two or more entropy sources of the identified several entropy sources. In certain implementations, the minimum number of entropy sources to provide the entropy bits for mixing into the entropy pool may be specified as a parameter of the method.

Entropy pool management component 182 may then mix, into entropy pool 230, at least the identified minimum number of bits received from each entropy source 210A-210K, by performing a mixing operation 220. Entropy pool 230 may be represented by a memory buffer, which in certain implementations may be protected from being accessed by user-level processes.

In certain implementations, mixing operation 220 may be implemented using various digest functions, such as cryptographic hash functions of the random data and, optionally, the current state of the entropy pool. Alternatively, if mixing operation 220 is performed during the hardware interrupt processing, such an operation may employ a cyclic redundancy check (CRC)-like mixing function rather than a cryptographic hash mixing function, thus substantially reducing the computational complexity of the mixing operation. Responsive to successfully completing the mixing operation, entropy pool management component 182 may increase entropy pool size 240 by the identified minimum number of bits among the numbers of bits received from entropy sources 210A-210K In an illustrative example, the entropy sources 210A-210K may comprise a network interface controller, a disk controller, and a keyboard. Entropy pool management component 182 may receive 2 bits from each of the network interface controller and the disk controller, and 1 bit from the keyboard. Entropy pool management component 182 may then mix, into the entropy pool, 2 entropy bits produced by mixing the 2 bits received from the network interface controller and 2 bits received from the disk controller. Entropy pool management component 182 may then increase the entropy pool size by 2 bits.

In another illustrative example, the entropy sources 210A-210K may comprise a network interface controller, a disk controller, and a keyboard. Entropy pool management component 182 may receive 2 bits from each of the network interface controller, the disk controller, and the keyboard. Entropy pool management component 182 may then mix, into the entropy pool, 2 bits produced by mixing the 2 bits received from the network interface controller, 2 bits received from the disk controller, and 2 bits received from the keyboard. Entropy pool management component 182 may then increase the entropy pool size by 2 bits.

The entropy pool management component may further make the entropy form the pool available to various applications. In certain implementations, the entropy pool management component may implement a random number generator producing a digest of a certain number of entropy bits.

In an illustrative example, the random number generator may produce a value to be returned to the requesting application by hashing a certain number of bytes of the entropy pool using a cryptographic hash function such as MDA5 or SHA-1. In another illustrative example, the random number generator may mix at least part of the result of the hashing operation back into the entropy pool, using the same mixing method as employed for mixing the random input data into the entropy pool. In another illustrative example, the random number generator may repeat the hashing operation at least a certain number of times. In another illustrative example, the random number generator may hash a certain number of bytes of the entropy pool using a cryptographic hash function such as MDA5 or SHA-1, mix the resulting hash back into the entropy pool using the same mixing method as employed for mixing the random input data into the entropy pool, hash a certain number of bytes of the entropy pool once more to obscure the data that was fed back to the pool, and return the resulting hash value to the caller. If more random data is required, the hashing process may be repeated two or more times.

In certain implementations, the random number generator may be implemented in the form of a device file, e.g., /dev/random, which may be readable by user-level processes. When a user-level process reads the /dev/random device file, the entropy pool management component only produce a return value if the number of bits available in the entropy pool is sufficient for producing such as value; otherwise, the read operation may block until the required quantity of entropy becomes available in the entropy pool.

Thus, a malicious party controlling only some of the entropy sources (e.g., by monitoring the traffic through one or more network interface controllers) would not be able to cause the applications to consume predictable pseudo-random numbers, even though a malicious party controlling at least one user-level application may still be able to deplete the entropy pool by issuing multiple entropy pool reads.

Figure 3A:
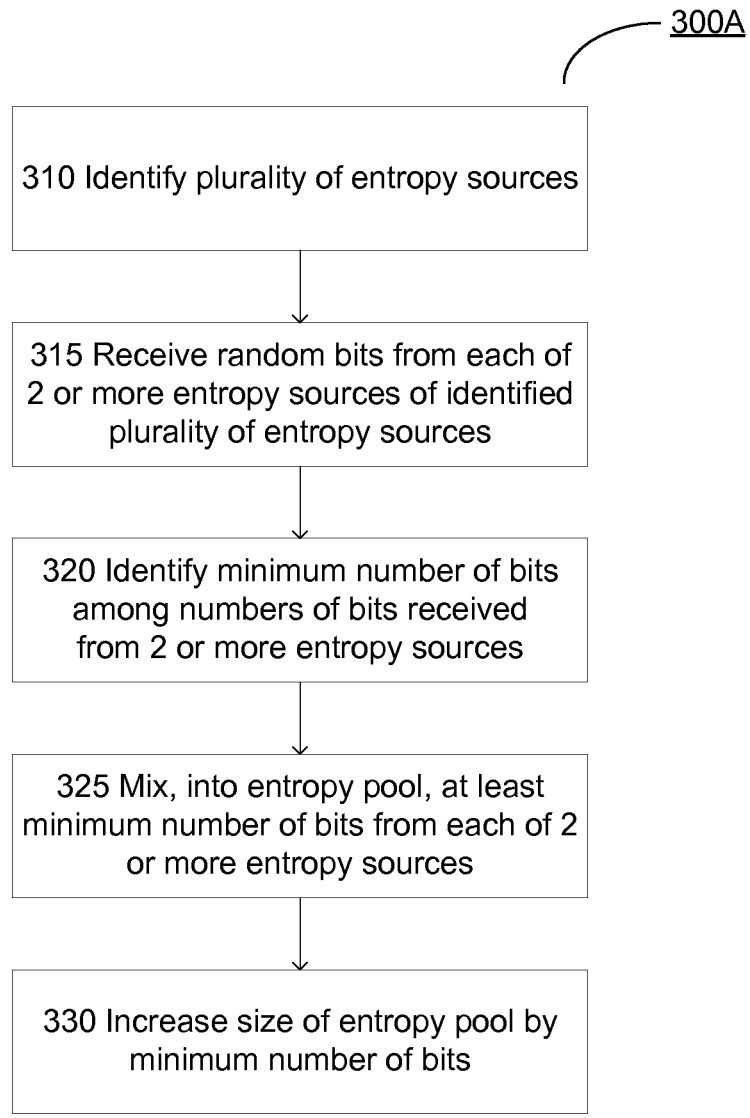
FIG. 3A-3B depict example flow diagrams of the methods for multi-factor entropy sourcing for random number generators, in accordance with one or more aspects of the present disclosure.

FIG. 3A depicts a flow diagram of one illustrative example of a method 300A for multi-factor entropy sourcing for random number generators, in accordance with one or more aspects of the present disclosure. Method 300A and/or each of its individual functions, routines, subroutines, or operations may be performed by one or more processing devices of the computer system (e.g., host computer system 100 of FIG. 1) implementing the method. In certain implementations, method 300A may be performed by a single processing thread. Alternatively, method 300A may be performed by two or more processing threads, each thread executing one or more individual functions, routines, subroutines, or operations of the method. In an illustrative example, the processing threads implementing method 300A may be synchronized (e.g., using semaphores, critical sections, and/or other thread synchronization mechanisms). Alternatively, the processing threads implementing method 300A may be executed asynchronously with respect to each other.

At block 310, an entropy pool management component being executed by a processing device of a computer system implementing the method may identify a plurality of entropy sources. In various illustrative examples, entropy sources may be provided by hardware devices, such as a keyboard, a mouse, or a network interface controller (NIC), as described in more details herein above.

At block 315, the entropy pool management component may receive random bits from each of the plurality of entropy sources. In various illustrative examples, the entropy pool management component may collect the information reflecting the timing of various hardware-related events and/or the data related to the hardware devices, e.g., by receiving the information from the operating system kernel and/or interrupt handlers of the respective hardware interrupts. In certain implementations, the collected random data may be pre-processed (e.g., compressed), as described in more details herein above.

At block 320, the entropy pool management component may identify the minimum number of bits among the numbers of bits received from two or more entropy sources of the identified plurality of entropy sources. In certain implementations, the minimum number of entropy sources to provide the entropy bits for mixing into the entropy pool may be specified as a parameter of the method.

At block 325, the entropy pool management component may mix, into an entropy pool, at least the identified minimum number of bits received from each of the two or more entropy sources. The entropy pool may be represented by a memory buffer, which in certain implementations may be protected from being accessed by user-level processes. In various illustrative examples, the mixing operation may be implemented using various digest functions, such as cryptographic hash functions of the random data and, optionally, the current state of the entropy pool. Alternatively, if the mixing operation is performed during the hardware interrupt processing, such an operation may employ a cyclic redundancy check (CRC)-like mixing function rather than a cryptographic hash mixing function, as described in more details herein above.

At block 330, the entropy pool management component may increase the size of the entropy pool by the identified minimum number of bits among the numbers of bits received from two or more entropy sources, and the method may terminate.

Figure 3B:
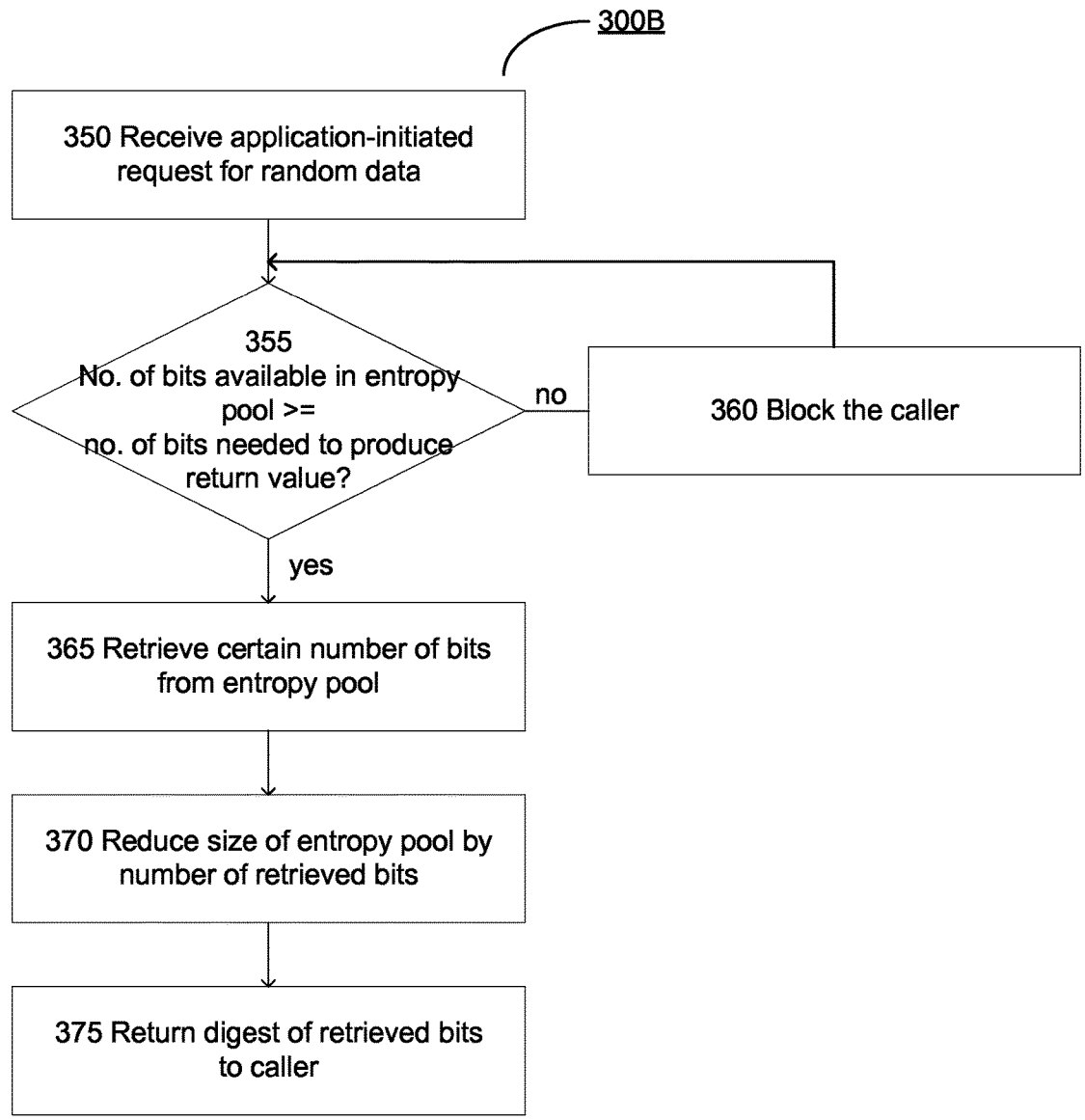

FIG. 3B depicts a flow diagram of one illustrative example of a method 300B for processing application requests for random data, in accordance with one or more aspects of the present disclosure. Method 300B and/or each of its individual functions, routines, subroutines, or operations may be performed by one or more processing devices of the computer system (e.g., host computer system 100 of FIG. 1) implementing the method. In certain implementations, method 300B may be performed by a single processing thread. Alternatively, method 300B may be performed by two or more processing threads, each thread executing one or more individual functions, routines, subroutines, or operations of the method. In an illustrative example, the processing threads implementing method 300B may be synchronized (e.g., using semaphores, critical sections, and/or other thread synchronization mechanisms). Alternatively, the processing threads implementing method 300B may be executed asynchronously with respect to each other.

At block 350, an entropy pool management component being executed by a processing device of a computer system implementing the method may, receive an application-initiated request for random data.

Responsive to ascertaining, at block 355, that the number of bits available in the entropy pool exceeds a threshold number bits that are necessary to produce a return value, the processing may continue at block 365; otherwise, at block 360, the caller application may be blocked until the required quantity of entropy becomes available in the entropy pool.

At block 365, the entropy pool management component may retrieve a certain number of bits from the entropy pool.

At block 370, the entropy pool management component may reduce the size of the entropy pool by the number of retrieved bits.

At block 375, the entropy pool management component may produce a return value represented by a digest (e.g., a cryptographic hash function such as MDA5 or SHA-1) of a certain number of entropy bits, as described in more details herein above, and the method may terminate.

Figure 4:
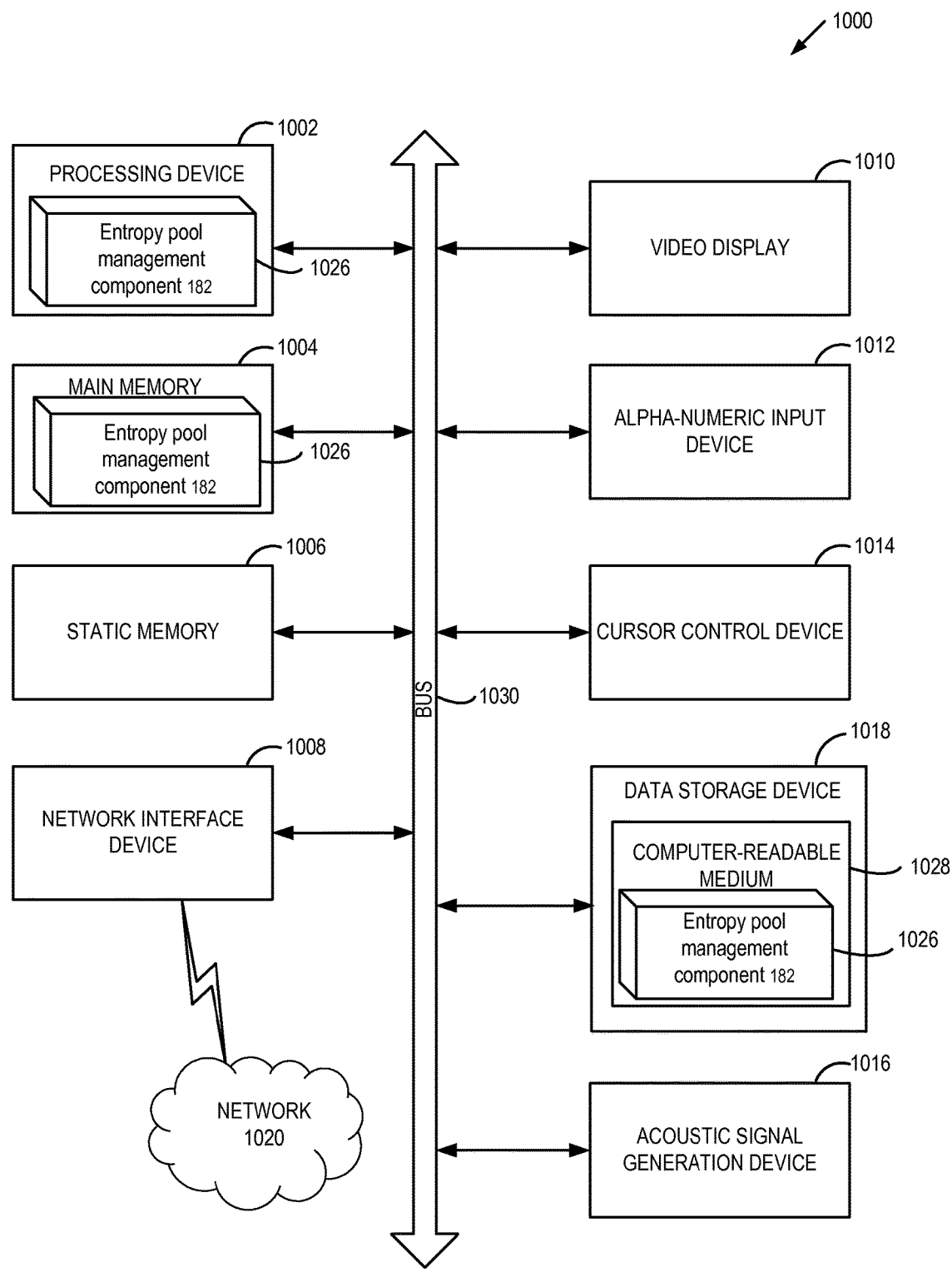
FIG. 4 depicts a block diagram of an example computer system operating in accordance with one or more aspects of the present disclosure.

FIG. 4 schematically illustrates a component diagram of an example computer system 1000 which can perform any one or more of the methods described herein. In various illustrative examples, computer system 1000 may represent host computer system 100 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute entropy pool management component 182 implementing method 300 for multi-factor entropy sourcing for random number generators.

Example computer system 1000 may further comprise a network interface controller 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of entropy pool management component 182 implementing method 300 for multi-factor entropy sourcing for random number generators.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface controller 1008.

While computer-readable storage medium 1028 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
identifying, by a processing device, a plurality of entropy sources;
receiving random bits from each of the plurality of entropy sources;
identifying a minimum number of bits among numbers of bits received from each of two or more entropy sources of the plurality of entropy sources;
mixing, into an entropy pool, at least the identified minimum number of bits received from each entropy source of two or more entropy sources; and
increasing a size of the entropy pool by the identified minimum number of bits.

2. The method of claim 1, wherein an entropy source of the plurality of entropy sources is provided by a hardware device represented by one of: a keyboard, a disk controller, a mouse, a processor, or a network interface controller (NIC).

3. The method of claim 1, wherein the entropy pool is represented by a memory buffer that is protected from being accessed by user-level processes.

4. The method of claim 1, wherein receiving the random bits comprises one of: measuring timing of events associated with the entropy sources or counting events associated with the entropy sources.

5. The method of claim 1, wherein receiving the random bits comprises compressing the random bits.

6. The method of claim 1, further comprising:
calculating a digest of at least the identified minimum number of bits received from each entropy source using at least one of: a cyclic redundancy check (CRC) function or a cryptographic hash function.

7. The method of claim 1, wherein mixing at least the identified minimum number of bits into the entropy pool is performed by an interrupt handler routine.

8. The method of claim 1, further comprising:
responsive to receiving a request for a random number, retrieving a certain number of bits from the entropy pool; and
reducing the size of the entropy pool by the certain number of bits.

9. The method of claim 8, wherein retrieving the certain number of bits from the entropy pool comprises blocking a caller process responsive to determining that a number of bits available in the entropy pool is less than a number of bits that is needed to produce a return value.

10. The method of claim 8, further comprising:
returning, to a calling process, a random value represented by a digest of the certain number of bits retrieved from the entropy pool.

11. A system, comprising:
a memory; and
a processing device operatively coupled to the memory, the processing device to:
receive random bits from each of a plurality of entropy sources;
identify a minimum number of bits among numbers of bits received from each of two or more entropy sources of the plurality of entropy sources;
mix, into an entropy pool, at least the identified minimum number of bits received from each entropy source of two or more entropy sources; and
increase a size of the entropy pool by the identified minimum number of bits.

12. The system of claim 11, wherein an entropy source of the plurality of entropy sources is provided by a hardware device represented by one of: a keyboard, a disk controller, a mouse, a processor, or a network interface controller (NIC).

13. The system of claim 1, wherein the entropy pool is represented by a memory buffer that is protected from being accessed by user-level processes.

14. The system of claim 11, wherein the processing device is further to:
calculate a digest of at least the identified minimum number of bits received from each entropy source using at least one of: a cyclic redundancy check (CRC) function or a cryptographic hash function.

15. The system of claim 1, wherein the processing device is further to:
responsive to receiving a request for a random number, retrieve a certain number of bits from the entropy pool; and
reduce the size of the entropy pool by the certain number of bits.

16. A computer-readable non-transitory storage medium comprising executable instructions to cause a processing device to:
identify, by the processing device, a plurality of entropy sources;
receive random bits from each of the plurality of entropy sources;
identify a minimum number of bits among numbers of bits received from each of two or more entropy sources of the plurality of entropy sources;
mix, into an entropy pool, at least the identified minimum number of bits received from each entropy source of two or more entropy sources; and
increase a size of the entropy pool by the identified minimum number of bits.

17. The computer-readable non-transitory storage medium of claim 16, further comprising executable instructions to cause the processing device to:
calculate a digest of at least the identified minimum number of bits received from each entropy source using at least one of: a cyclic redundancy check (CRC) function or a cryptographic hash function.

18. The computer-readable non-transitory storage medium of claim 16, further comprising executable instructions to cause the processing device to:
responsive to receiving a request for a random number, retrieve a certain number of bits from the entropy pool; and
reduce the size of the entropy pool by the certain number of bits.

19. The computer-readable non-transitory storage medium of claim 18, wherein instructions to retrieve the certain number of bits from the entropy pool comprise executable instructions to cause the processing device to:

block a caller process responsive to determining that a number of bits available in the entropy pool is less than a number of bits that is needed to produce a return value.

20. The computer-readable non-transitory storage medium of claim 18, further comprising executable instructions to cause the processing device to:

return, to a calling process, a random value represented by a digest of the certain number of bits retrieved from the entropy pool.

* * * * *